(12) United States Patent
Harris et al.

(10) Patent No.: US 12,187,177 B2
(45) Date of Patent: Jan. 7, 2025

(54) TRUCK TAILGATE REPLACEMENTS WITH ADJUSTABLE SLIDERS AND TRUCKS INCLUDING THE TAILGATE REPLACEMENTS

(71) Applicant: Toyota Motor Engineering & Manufacturing North America, Inc., Plano, TX (US)

(72) Inventors: Ryan C. Harris, Saline, MI (US); Scott L. Frederick, Brighton, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 303 days.

(21) Appl. No.: 17/835,450

(22) Filed: Jun. 8, 2022

(65) Prior Publication Data

US 2023/0398923 A1 Dec. 14, 2023

(51) Int. Cl.
 *B60P 3/40* (2006.01)
 *B62D 33/023* (2006.01)
 *B62D 33/03* (2006.01)

(52) U.S. Cl.
 CPC .............. *B60P 3/40* (2013.01); *B62D 33/023* (2013.01); *B62D 33/03* (2013.01)

(58) Field of Classification Search
 CPC ................ B62D 33/023; B62D 33/027; B62D 33/0273; B62D 33/03; B62D 33/033; B60P 3/40; B60P 7/0892
 USPC .................................................. 296/57.1, 50
 See application file for complete search history.

(56) References Cited

U.S. PATENT DOCUMENTS

| | | | |
|---|---|---|---|
| 5,605,367 A * | 2/1997 | Mc Cormack | B62D 35/007 |
| | | | 296/180.1 |
| 6,364,392 B1 | 4/2002 | Meinke | |
| 7,156,592 B1 | 1/2007 | Cava | |
| 7,182,380 B2 | 2/2007 | Nagle | |

(Continued)

FOREIGN PATENT DOCUMENTS

| | | | | |
|---|---|---|---|---|
| CN | 103089000 B | * | 5/2015 | |
| CN | 208844904 U | * | 5/2019 | ............... E04G 7/12 |

(Continued)

OTHER PUBLICATIONS

DE202009018707 Text (Year: 2013).*
CN103089000 Text (Year: 2015).*
CN208844904 Text (Year: 2019).*

*Primary Examiner* — Dennis H Pedder
(74) *Attorney, Agent, or Firm* — Dinsmore & Shohl LLP

(57) ABSTRACT

A truck includes a passenger cabin and a truck bed located rearward of the passenger cabin in a vehicle longitudinal direction. The truck bed includes a bed deck and a pair of spaced apart sidewalls. A tailgate replacement extends across a rear opening to the truck bed and between the sidewalls. The tailgate replacement includes vertically-extending support rails and vertically spaced-apart, laterally-extending support rails that extend between the vertically-extending support rails. A slider is connected to the laterally-extending support rails. The slider includes a first connecting portion that slidably engages a first one of the laterally-extending support rails and a second connecting portion that slidably engages a second one of the laterally-extending support rails.

12 Claims, 2 Drawing Sheets

(56) References Cited

U.S. PATENT DOCUMENTS

| | | |
|---|---|---|
| 7,976,089 B2 | 7/2011 | Jones |
| 9,586,514 B2 | 3/2017 | Asao et al. |
| 2011/0101720 A1* | 5/2011 | Leitner ................ B62D 33/037 |
| | | 296/26.08 |

FOREIGN PATENT DOCUMENTS

| | | | |
|---|---|---|---|
| DE | 202009018707 U1 * | 1/2013 | .............. F16L 23/08 |
| WO | 2021171272 A1 | 9/2021 | |

* cited by examiner

TRUCK TAILGATE REPLACEMENTS WITH ADJUSTABLE SLIDERS AND TRUCKS INCLUDING THE TAILGATE REPLACEMENTS

TECHNICAL FIELD

The present specification generally relates to trucks and, more specifically, to trucks with truck beds and tailgate replacements with adjustable sliders for use in dividing the tailgate replacements into sections.

BACKGROUND

There exists a number of tailgate replacements in the market. Typically, these tailgate replacements are meant to accommodate a fifth wheel or gooseneck trailer. What is needed is a tailgate that functions with or without cargo that extends past the length of the truck bed.

SUMMARY

In accordance with one embodiment, a truck includes a passenger cabin and a truck bed located rearward of the passenger cabin in a vehicle longitudinal direction. The truck bed includes a bed deck and a pair of spaced apart sidewalls. A tailgate replacement extends across a rear opening to the truck bed and between the sidewalls. The tailgate replacement includes vertically-extending support rails and vertically spaced-apart, laterally-extending support rails that extend between the vertically-extending support rails. A slider is connected to the laterally-extending support rails. The slider includes a first connecting portion that slidably engages a first one of the laterally-extending support rails and a second connecting portion that slidably engages a second one of the laterally-extending support rails.

A tailgate replacement configured to extend across a rear opening to a truck bed and between sidewalls of the truck bed includes vertically-extending support rails and vertically spaced-apart, laterally-extending support rails that extend between the vertically-extending support rails. A slider is connected to the laterally-extending support rails. The slider includes a first connecting portion that slidably engages a first one of the laterally-extending support rails and a second connecting portion that slidably engages a second one of the laterally-extending support rails.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Pickup trucks according to the present specification include a passenger cabin and a truck bed located rearward of the passenger cabin. The truck bed includes opposite sidewalls and a bed deck that extends between the sidewalls. A tailgate replacement extends across a rear opening to the truck bed and between the sidewalls. The tailgate replacement includes vertically-extending support rails, vertically spaced-apart, laterally-extending support rails that extend between the vertically-extending support rails, a slider that is connected to the laterally-extending support rails, and a releasable connector configured to releasably connect the slider to one or both of the laterally extending support rails such that the releasable connector having a release configuration that allows the slider to be slid along lengths of the laterally-extending support rails and a lock configuration that prevents the slider from being slid along the lengths of the laterally-extending support rails.

Figure 1:
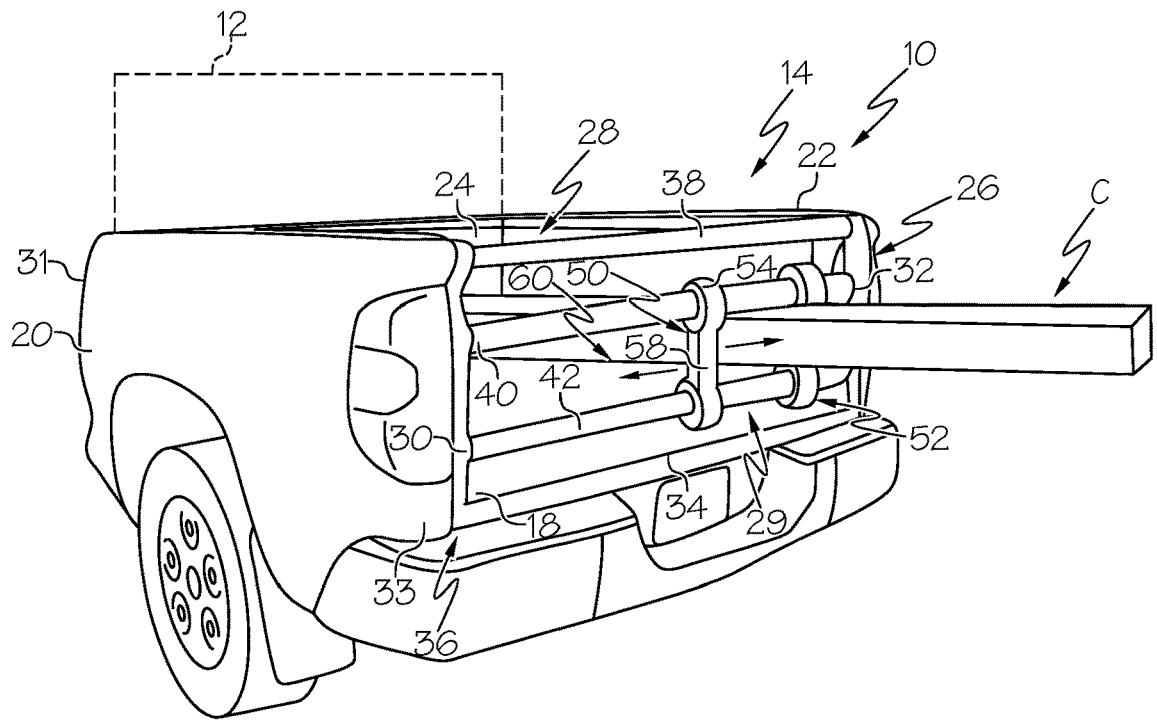
FIG. 1 diagrammatically depicts a rear view of a portion of a pickup truck having a truck bed and a tailgate replacement with sliders, according to one or more embodiments shown and described herein.

As used herein, the term "vehicle longitudinal direction" or "longitudinal" refer to the forward-rearward direction of the pickup truck (i.e., in the +/- vehicle Y direction depicted in FIG. 1). The term "vehicle lateral direction" or "lateral" refer to the cross-pickup truck direction (i.e., in the +/- vehicle X direction depicted in FIG. 1), and is transverse to the vehicle longitudinal direction. The term "vehicle vertical direction" or "vertical" refer to the upward-downward direction of the pickup truck (i.e., in the +/- vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

The terms "outboard" or "outward" as used herein refers to the relative location of a component in a direction with respect to a pickup truck centerline. The term "inboard" or "inward" as used herein refers to the relative location of a component in a direction with respect to the pickup truck centerline. Because the pickup truck structures may be generally symmetrical about the pickup truck centerline, the direction to which use of terms "inboard," "inward," "outboard" and "outward" refer may be mirrored about the pickup truck centerline when evaluating components positioned along opposite sides of the pickup truck 10.

Referring to FIG. 1, a pickup truck is generally illustrated at 10. The pickup truck 10 includes a passenger cabin 12 (represented by dashed lines) and a truck bed 14. The truck bed 14 includes a bed deck 18, a pair of spaced apart sidewalls 20, 22, a front wall 24, and a tailgate replacement 26. The bed deck 18, the sidewalls 20, 22, the front wall 24, and the tailgate replacement 26 define a storage area 28 of the truck bed 14.

The sidewalls 20, 22 extend parallel to the vehicle longitudinal direction. Each sidewall 20, 22 includes a front end 31 and an opposite rear end 33. The front wall 24 extends between the front ends 31 of the sidewalls 20, 22. The tailgate replacement 26 extends inboard of the sidewalls 20 and 22, between the rear ends 33 of the sidewalls 20, 22.

The tailgate replacement 26 may be pivotally connected to the sidewalls 20, 22 for movement between a closed position and an open position. In the closed position, the tailgate replacement 26 extends parallel to the vehicle vertical direction. In the open position, the tailgate replacement 26 extends parallel to the vehicle longitudinal direction.

The tailgate replacement 26 is illustrated in the closed position, extending across a rear opening 29 to the storage area 28 and between the sidewalls 20, 22. The tailgate replacement 26 includes vertically-extending support rails 30 and 32 that extend vertically upward from a base rail 34 at each sidewall 20, 22. The base rail 34 and the vertically-extending support rails 30 and 32 can provide a frame member 36 for the tailgate replacement 26. Laterally-extending support rails 38, 40 and 42 extend between the vertically-extending support rails 30 and 32. While three laterally-extending support rails 38, 40 and 42 are illustrated, there can be more or less than three laterally-extending support rails 38, 40 and 42. The pitch and heights of the laterally-extending support rails 38, 40, 42 may be selected based on operator needs. In some embodiments, the pitch and height of the laterally-extending support rails 38, 40, 42 may be adjustable. The laterally-extending support rails 38, 40 and 42 are spaced-apart from each other in the vehicle vertical direction and are substantially parallel to each other.

Figure 2:
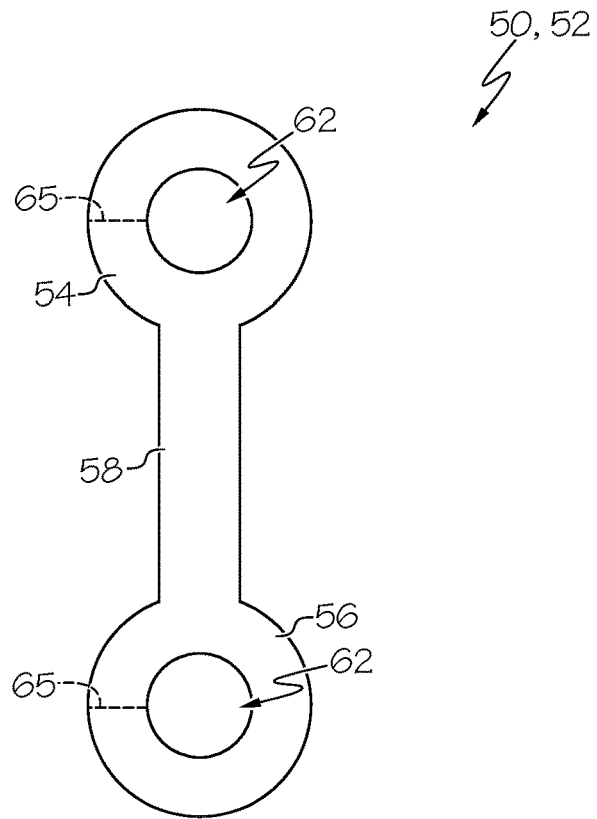
FIG. 2 diagrammatically depicts a side view of a slider for use with the tailgate replacement of FIG. 1, according to one or more embodiments shown and described herein.

Sliders 50 and 52 are connected to the laterally-extending support rails 40 and 42. While two sliders 50 and 52 are illustrated, there may be more or less than two sliders. Referring also to FIG. 2, each slider 50, 52 includes a first connecting portion 54 connected to the first laterally-extending support rail 40 and a second connecting portion 56 connected to the second laterally-extending support rail 42. In the illustrated example, the first and second connecting portions 54 and 56 are enlarged in width compared to a central portion 58 that spans a gap 60 (FIG. 1) between the first and second laterally-extending support rails 40 and 42. Each connecting portion 54 and 56 has an opening 62 that extends therethrough that is sized and shaped to receive one of the first and second laterally-extending support rails 40 and 42. For example, the openings 62 may be rectangular, circular, ovular, etc. to match the cross-sectional shape of the first and second laterally-extending support rails 40 and 42. The openings 62 are also sized to allow the sliders 50 and 52 to slide along the laterally-extending support rails 40 and 42 toward and away from each other, increasing and decreasing a distance between the two sliders 50 and 52. In the illustrated embodiment, the connecting portions 54 and 56 are formed as closed loops such that their openings 62 are closed and extend entirely around their respective first and second laterally-extending support rail 40 and 42. In some embodiments, the connecting portions 54 and 56 may be provided with slits (represented by dashed lines 65) or gaps that are breaks in the connecting portions 54 and 56. The slits 65 or breaks can be used to open the connecting portions 54 and 56 and place the connecting portions 54 and 56 about their respective laterally-extending support rails 40, 42. Hinges may be provided to allow a portion of the connecting portions to swing open. In some embodiments, the laterally-extending support rails 40, 42 are removed from the frame member 36 so that the connecting portions 54 and 56 can be slid over ends of the laterally-extending support rails 40, 42 and slid into desired positions.

The sliders 50 and 52 may be formed of any suitable material, such as plastic, metal, rubber, etc. Any suitable process may be used to form the sliders 50 and 52, such as casting, machining, molding, etc.

Figure 3:
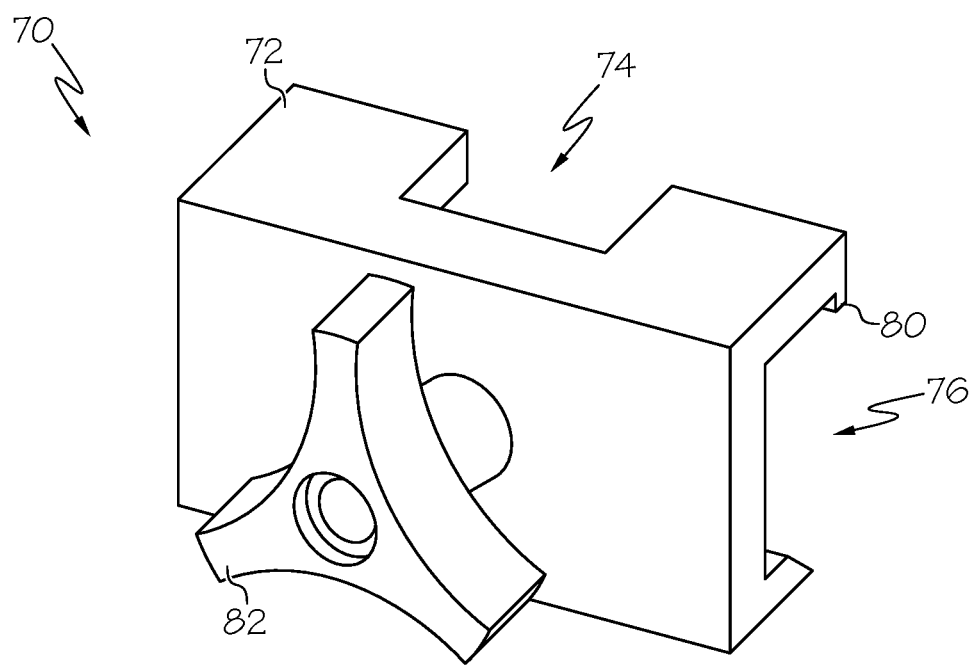
FIG. 3 diagrammatically depicts a clamp for clamping a lateral position of the dividers of FIG. 1, according to one or more embodiments shown and described herein.

A releasable connector may be used to lock the positions of the sliders 50 and 52 on the first and second laterally-extending support rails 40 and 42. The releasable connector may be any suitable connector, such as clamps, spring-loaded pins, cam-type locks, etc. As an example, FIG. 3 illustrates a screw-type clamp 70 that can be used as a releasable connector to lock the position of the sliders 50 and 52. The screw-type clamp 70 may include a clamp body 72 having a notch 74 that is sized to receive one of the connecting portions 54 and 56 and a groove 76 that is sized to receive one of the laterally-extending support rails 40 and 42. The clamp body 72 may include flanges 80 that grip about portions of the laterally-extending support rails 40 and 42. A screw member 82 may be provided such that turning the screw member relative to the clamp body 72 moves the screw-type clamp 70 from a release configuration that allows for sliding of the sliders 50 and 52 along lengths of the laterally-extending support rails 40 and 42 and a lock configuration that prevents the sliders 50 and 52 from being slid along the lengths of the laterally-extending support rails 40 and 42.

FIG. 1 also shows a process of transporting cargo. In the example, cargo C, such as lumber, may be longer than the truck bed 14, yet narrower than a width of the truck bed 14. In order to constrain the cargo C in the vehicle vertical direction, the cargo C may be placed between the laterally-extending support rails 40 and 42. In order to constrain the cargo C in the vehicle lateral direction, the cargo C may also be placed between the sliders 50 and 52. The lateral position of the sliders 50 and 52 can be adjusted as needed and locked in place using the releasable connector 70.

The above-described replacement tailgates provide laterally-extending support rails against which the cargo can rest and also be constrained in the vertical direction. The sliders are provided that can move laterally and constrain side-to-side movement of the cargo. Releasable connectors can be used to lock positions of the sliders at desired locations and distance between each other.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A truck comprising:
   a passenger cabin;
   a truck bed located rearward of the passenger cabin in a vehicle longitudinal direction, the truck bed includes a bed deck and a pair of spaced apart sidewalls;
   a tailgate replacement extends across a rear opening to the truck bed and between the sidewalls, the tailgate replacement comprises:
   vertically-extending support rails;
   vertically spaced-apart, laterally-extending support rails that extend between the vertically-extending support rails; and
   a slider that is connected to the laterally-extending support rails, the slider comprising a first connecting portion that slidably engages a first one of the laterally-extending support rails and a second connecting portion that slidably engages a second one of the laterally-extending support rails;
   wherein the first connecting portion comprises a break through a sidewall of the first connecting portion that is configured to provide a portion that swings open while remaining connected to place the first connecting portion about the first one of the laterally-extending support rails.

2. The truck of claim 1, wherein the tailgate replacement comprises a releasable connector configured to releasably connect the slider to the first one of the first laterally extending support rails, the releasable connector having a release configuration that allows the slider to be slid along a length of the first one of the laterally-extending support rails and a lock configuration that prevents the slider from being slid along the length of the first one of the laterally-extending support rails.

3. The truck of claim 1, wherein the slider includes a central portion that spans a gap between the first one of the laterally-extending support rails and the second one of the laterally-extending support rails.

4. The truck of claim 3, wherein the first and second connecting portions have a greater width than the central portion.

5. The truck of claim 1, wherein the first connecting portion has an opening extending therethrough that is sized and shaped to extend about the first one of the laterally-extending support rails and the second connecting portion has another opening that is sized and shaped to extend about the second one of the laterally-extending support rails.

6. The truck of claim 1, wherein the vertically-extending support rails are part of a support frame to which the laterally-extending support rails are connected.

7. A tailgate replacement configured to extend across a rear opening to a truck bed and between sidewalls of the truck bed, the tailgate replacement comprising:
   vertically-extending support rails;
   vertically spaced-apart, laterally-extending support rails that extend between the vertically-extending support rails; and
   a slider that is connected to the laterally-extending support rails, the slider comprising a first connecting portion that slidably engages a first one of the laterally-extending support rails and a second connecting portion that slidably engages a second one of the laterally-extending support rails;
   wherein the first connecting portion comprises a break through a sidewall of the first connecting portion that is configured to provide a portion that swings open while remaining connected to place the first connecting portion about the first one of the laterally-extending support rails.

8. The tailgate replacement of claim 7 further comprising a releasable connector configured to releasably connect the slider to the first one of the first laterally extending support rails, the releasable connector having a release configuration that allows the slider to be slid along a length of the first one of the laterally-extending support rails and a lock configuration that prevents the slider from being slid along the length of the first one of the laterally-extending support rails.

9. The tailgate replacement of claim 7, wherein the slider includes a central portion that spans a gap between the first one of the laterally-extending support rails and the second one of the laterally-extending support rails.

10. The tailgate replacement of claim 9, wherein the first and second connecting portions have a greater width than the central portion.

11. The tailgate replacement of claim 7, wherein the first connecting portion has an opening extending therethrough that is sized and shaped to extend about the first one of the laterally-extending support rails and the second connecting portion has another opening that is sized and shaped to extend about the second one of the laterally-extending support rails.

12. The tailgate replacement of claim 7, wherein the vertically-extending support rails are part of a support frame to which the laterally-extending support rails are connected.

* * * * *